United States Patent
Iwai et al.

(10) Patent No.: US 9,608,745 B2
(45) Date of Patent: Mar. 28, 2017

(54) INFORMATION DELIVERY SYSTEM, GATEWAY DEVICE, DELIVERY CONTROL METHOD, AND NON-TRANSITORY COMPUTER READABLE MEDIUM STORING PROGRAM

(71) Applicant: NEC Corporation, Tokyo (JP)

(72) Inventors: Takanori Iwai, Tokyo (JP); Hajime Zembutsu, Tokyo (JP)

(73) Assignee: NEC Corporation, Tokyo (JP)

( * ) Notice: Subject to any disclaimer, the term of this patent is extended or adjusted under 35 U.S.C. 154(b) by 5 days.

(21) Appl. No.: 14/396,681

(22) PCT Filed: Apr. 23, 2013

(86) PCT No.: PCT/JP2013/002725
§ 371 (c)(1),
(2) Date: Oct. 23, 2014

(87) PCT Pub. No.: WO2013/161274
PCT Pub. Date: Oct. 31, 2013

(65) Prior Publication Data
US 2015/0111490 A1    Apr. 23, 2015

(30) Foreign Application Priority Data

Apr. 26, 2012    (JP) .................................. 2012-101826

(51) Int. Cl.
*H04M 11/04*    (2006.01)
*H04H 20/59*    (2008.01)
(Continued)

(52) U.S. Cl.
CPC ............ *H04H 20/59* (2013.01); *H04H 20/72* (2013.01); *H04W 4/06* (2013.01); *H04W 4/22* (2013.01); *H04W 4/005* (2013.01); *H04W 4/02* (2013.01)

(58) Field of Classification Search
CPC ......... H04H 20/59; H04H 20/72; H04W 4/06; H04W 4/22; H04W 4/005; H04W 4/02
(Continued)

(56) References Cited

U.S. PATENT DOCUMENTS 8,707,335 B2 *    4/2014    Akiyama ................ G06F 9/542
                                                          719/313
2002/0138601 A1 *    9/2002    Piponius ................. H04L 29/06
                                                          709/223
(Continued)

FOREIGN PATENT DOCUMENTS

CA    2 591 540 A1    6/2006
CA    2 728 247 A1    12/2009
(Continued)

OTHER PUBLICATIONS

International Search Report corresponding to PCT/JP2013/002725, dated Jul. 9, 2013 (5 pages).
(Continued)

*Primary Examiner* — Dominic Rego
(74) *Attorney, Agent, or Firm* — Wilmer Cutler Pickering Hale and Dorr LLP

(57) ABSTRACT

To provide an information delivery system, a gateway device, a delivery control method and a program that can be used by various business entities to meet diversified needs for information delivery, an information delivery system includes an event detection device (10) that is configured to detect occurrence of a plurality of events and specify delivery area information of event information according to the events, and a delivery device (20) that delivers the event information to a delivery destination node corresponding to the delivery area information specified by the event detection device (10).

16 Claims, 14 Drawing Sheets

(51) Int. Cl.
  *H04W 4/06* (2009.01)
  *H04W 4/22* (2009.01)
  *H04H 20/72* (2008.01)
  *H04W 4/00* (2009.01)
  *H04W 4/02* (2009.01)

(58) Field of Classification Search
  USPC ......... 455/404.1, 404.2, 414.2, 414.3, 456.1, 455/456.2
  See application file for complete search history.

(56) References Cited

U.S. PATENT DOCUMENTS

| | | | |
|---|---|---|---|
| 2003/0129973 A1* | 7/2003 | Oishi | H04M 3/54 455/414.1 |
| 2003/0143974 A1 | 7/2003 | Navarro | |
| 2003/0236985 A1* | 12/2003 | Ruuth | G06F 21/35 713/173 |
| 2004/0136408 A1 | 7/2004 | Tomobe et al. | |
| 2005/0270999 A1* | 12/2005 | Schiff | H04B 7/18543 370/318 |
| 2006/0071684 A1* | 4/2006 | Schwarz | H04L 41/12 326/39 |
| 2006/0276168 A1* | 12/2006 | Fuller, Jr. | H04M 11/04 455/404.2 |
| 2007/0033153 A1* | 2/2007 | Yamanaka | G01V 1/008 706/21 |
| 2007/0077922 A1 | 4/2007 | Kim et al. | |
| 2007/0123220 A1 | 5/2007 | Weiser et al. | |
| 2007/0153704 A1* | 7/2007 | Min | G08G 1/0962 370/252 |
| 2007/0161380 A1* | 7/2007 | Fok | H04W 64/00 455/456.1 |
| 2007/0270139 A1* | 11/2007 | Jendbro | H04L 67/04 455/422.1 |
| 2008/0111705 A1* | 5/2008 | Lee | G08B 27/008 340/690 |
| 2008/0117852 A1* | 5/2008 | Bennett | H04L 12/189 370/312 |
| 2008/0151812 A1* | 6/2008 | Camp, Jr. | H04W 56/0045 370/320 |
| 2008/0239388 A1* | 10/2008 | Kudo | G03G 15/5075 358/1.15 |
| 2008/0261554 A1 | 10/2008 | Keller et al. | |
| 2009/0028176 A1* | 1/2009 | Godlewski | H04L 12/5695 370/458 |
| 2009/0068992 A1* | 3/2009 | Takehara | H04W 4/02 455/412.1 |
| 2009/0191896 A1* | 7/2009 | Ge | H04W 64/00 455/456.2 |
| 2009/0204707 A1* | 8/2009 | Kamegaya | G08B 27/005 709/224 |
| 2009/0234717 A1* | 9/2009 | Wiggins | G06Q 30/0252 705/14.5 |
| 2010/0070596 A1* | 3/2010 | Watanabe | G08G 1/096775 709/206 |
| 2010/0207776 A1* | 8/2010 | Takuno | H04M 11/04 340/690 |
| 2010/0275224 A1* | 10/2010 | Sheng | H04H 20/38 725/14 |
| 2011/0098832 A1* | 4/2011 | Zhang | H04L 12/2818 700/90 |
| 2011/0150217 A1* | 6/2011 | Kim | H04N 21/23432 380/210 |
| 2011/0165855 A1 | 7/2011 | Hapsari et al. | |
| 2011/0270984 A1 | 11/2011 | Park | |
| 2011/0302598 A1* | 12/2011 | Lundgren | H04L 63/102 725/25 |
| 2012/0002549 A1* | 1/2012 | Dempo | H04L 45/125 370/235 |
| 2012/0058775 A1* | 3/2012 | Dupray | G01S 5/0257 455/456.1 |
| 2012/0108211 A1* | 5/2012 | Nakajima | H04M 1/72577 455/411 |
| 2012/0150991 A1* | 6/2012 | Krueger | H04N 21/242 709/217 |
| 2012/0226752 A1* | 9/2012 | Jeong | H04L 67/02 709/204 |
| 2013/0040605 A1* | 2/2013 | Zhang | H04W 48/06 455/411 |
| 2013/0046547 A1* | 2/2013 | Drucker | G06Q 10/00 705/1.1 |
| 2013/0073746 A1* | 3/2013 | Singh | H04W 52/0219 709/248 |
| 2013/0198531 A1* | 8/2013 | Hansen | A61N 1/08 713/300 |

FOREIGN PATENT DOCUMENTS

| | | |
|---|---|---|
| EP | 2 302 959 A1 | 3/2011 |
| JP | 2004-015440 A | 1/2004 |
| JP | 2004-221913 A | 8/2004 |
| JP | 2005-045831 A | 2/2005 |
| JP | 2008-526058 A | 7/2008 |
| JP | 2009-290669 A | 12/2009 |
| JP | 2009-303174 A | 12/2009 |
| JP | 2010-045747 A | 2/2010 |

OTHER PUBLICATIONS

Russian Office Action issued by the Federal Service on Intellectual Property for Application No. 2014147461 dated Jul. 26, 2016 (17 pages).
3GPP 3rd Generation Partnership Project; Technical Specification Group Services and System Aspects; Earthquake and Tsunami Warning System (ETWS) Requirements; Stage 1 (Release 8), TS 22.168 V8.2.0, Mar. 14, 2012, 12 pages.
3GPP Digital Cellular Telecommunications System (Phase 2+); Universal Mobile Telecommunications System (UMTS); Technical Realization of Cell Broadcast Service (CBS), TS 123 041, V10.3.0, Mar. 1, 2012, 53 pages.
Extended European Search Report corresponding to European Application No. 13780734.3, dated Oct. 8, 2015, 7 pages.

* cited by examiner

| AREA INFORMATION | BASE STATION |
|---|---|
| AREA A | eNB#1, eNB#2, eNB#3 |
| AREA B | eNB#4, eNB#5, eNB#6 |
| AREA C (ALONG ROUTE X) | eNB#7, eNB#8 |

| BUSINESS ENTITY | PRIORITY |
|---|---|
| BUSINESS ENTITY A | PRIORITY_1 |
| BUSINESS ENTITY B | PRIORITY_2 |
| BUSINESS ENTITY C | PRIORITY_3 |

Fig. 8

| DELIVERY CONTENTS | DATA FORMAT |
|---|---|
| TEXT INFORMATION | TEXT MESSAGE |
| ROUTE INFORMATION | MAP DATA |
| DEVICE CONTROL | DEVICE CONTROL SIGNAL |

Fig. 12

INFORMATION DELIVERY SYSTEM, GATEWAY DEVICE, DELIVERY CONTROL METHOD, AND NON-TRANSITORY COMPUTER READABLE MEDIUM STORING PROGRAM

CROSS-REFERENCE TO RELATED APPLICATIONS

This application is a national stage application of International Application No. PCT/JP2013/002725 entitled "Information Delivery System, Gateway Device, Delivery Control Method, and Non-Transitory Computer Readable Medium Storing Program" filed on Apr. 23, 2013, which claims the benefit of the priority of Japanese Patent Application No. 2012-101826, filed on Apr. 26, 2012, the disclosures of each of which are hereby incorporated by reference in their entirety.

TECHNICAL FIELD

The present invention relates to an information delivery system and, particularly, to an information delivery system that changes a delivery area according to an event.

BACKGROUND ART

CBS (Cell Broadcast Service) is used for emergency information delivery in a mobile network today. The CBS sends emergency information through broadcast to mobile phone terminals located in a target area to deliver the emergency information. Further, ETWS (Earthquake and Tsunami Warning System) is specified for more rapid disaster alert and more flexible delivery area.

For example, the rapid disaster alert is achieved by separately delivering two types of signals: a first report that delivers the most urgent minimum information such as "earthquake occurred" in the quickest way and a second report that delivers additional information such as a seismic intensity and an epicenter.

Further, the flexible delivery area is achieved by selectively using a delivery area according to three levels: Cell level, TA (Tracking Area) level and EA (Emergency Area) level.

Regarding the flexible delivery area, Patent Literature 1 discloses a technique that specifies a delivery area of an emergency message in units of wide areas or in units of sectors.

CITATION LIST

Patent Literature

PTL1: Japanese Unexamined Patent Application Publication No. 2010-45747

SUMMARY OF INVENTION

Technical Problem

The needs for emergency information delivery are expected to be diversified in the future. For example, at present, emergency information related to earthquakes and Tsunami is delivered in emergency information delivery using CBS. In the future, however, it is desired to deliver emergency information other than natural disasters. Further, it is desired to deliver emergency information or the like to an area desired by a business entity or the like that requests delivery of emergency information. However, the present CBS does not have the system architecture to meet such diversified needs, and it is therefore necessary to make further system modifications in order to meet the diversified needs.

An exemplary object of the present invention is to provide an information delivery system, a gateway device, a delivery control method and a program that can be used by various business entities to meet diversified needs for information delivery.

Solution to Problem

An information delivery system according to a first exemplary aspect of the present invention includes an event detection means configured to detect occurrence of a plurality of events and specify delivery area information of event information according to the events, and a delivery means for delivering the event information to a delivery destination node corresponding to the delivery area information specified by the event detection means.

A gateway device according to a second exemplary aspect of the present invention includes a receiving unit that receives a delivery request containing event information and delivery area information from an event detection device configured to detect occurrence of a plurality of events and specify delivery area information of event information according to the events, and a control unit that determines a delivery destination node corresponding to the delivery area information based on the delivery area information.

A delivery control method according to a third exemplary aspect of the present invention includes receiving a delivery request containing event information and delivery area information from an event detection device configured to specify delivery area information of event information according to a plurality of events, and determining a delivery destination node corresponding to the delivery area information based on the delivery area information.

A program according to a fourth exemplary aspect of the present invention causes a computer to execute a step of receiving a delivery request containing event information and delivery area information from an event detection device configured to specify delivery area information of event information according to a plurality of events, and a step of determining a delivery destination node corresponding to the delivery area information based on the delivery area information.

Advantageous Effects of Invention

According to the above-described exemplary aspects of the present invention, it is possible to provide an information delivery system, a gateway device, a delivery control method and a program that can be used by various business entities to meet diversified needs for information delivery.

BRIEF DESCRIPTION OF DRAWINGS

FIG. 8 is a block diagram of a priority information DB according to the second exemplary embodiment.

FIG. 12 is a block diagram of a data format information DB according to the third exemplary embodiment.

DESCRIPTION OF EMBODIMENTS

First Exemplary Embodiment

Figure 1:
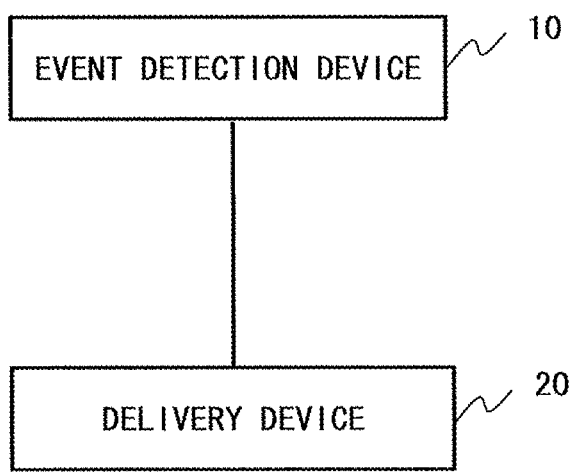
FIG. 1 is a block diagram of an information delivery system according to a first exemplary embodiment.

Exemplary embodiments of the present invention are described hereinafter with reference to the drawings. First, a configuration example of an information delivery system according to a first exemplary embodiment of the invention is described with reference to FIG. 1. The information delivery system in FIG. 1 includes an event detection device 10 and a delivery device 20.

The event detection device 10 detects the occurrence of a plurality of events. The event detection device 10 specifies delivery area information of event information according to the detected events. The occurrence of events is the occurrence of natural disasters such as an earthquake or Tsunami, the occurrence of a fire, the occurrence of a traffic accident, the occurrence of a crime or the like, for example. Further, the events may include an incidental event that occurs with the occurrence of the above-described event, such as the operation of an emergency vehicle with the occurrence of a fire or a traffic accident.

The event detection device 10 detects the occurrence of such an event. For example, the event detection device 10 may detect the occurrence of a natural disaster by receiving a notification about the occurrence of a natural disaster through a computer connected to a government agency. Further, the event detection device 10 may detect the occurrence of a fire, a traffic accident, a crime or the like by receiving a notification about the occurrence of a fire, a traffic accident, a crime or the like through a computer connected to a fire station or a police station. Furthermore, the event detection device 10 may detect the operation of an emergency vehicle by communicating with a communication device or the like mounted on the emergency vehicle.

The delivery area information may be information that specifies several meters or several kilometers radius of a point where a natural disaster, a fire, an accident, a crime or the like occurs, for example. Alternatively, the delivery area information may be information that specifies an area within several kilometers in up and down paths from a point of an expressway where a traffic accident occurs. Alternatively, the delivery area information may be information related to a traveling route of an emergency vehicle. The event detection device 10 notifies the specified delivery area information to the delivery device 20.

The delivery device 20 delivers event information to a delivery destination node corresponding to the delivery area information specified by the event detection device 10. In the case where the delivery device 20 is located in a mobile communication network, the delivery destination node may be a base station or the like, for example. In the case where the delivery device 20 is located in a wireless LAN network, the delivery destination node may be an access point or the like, for example. In the case where the delivery device 20 is located in a network different from those networks, the delivery device 20 may be a communication node that delivers information to a communication terminal or the like.

As described above, the event detection device 10 can receive a plurality of events notified from different organizations. Thus, the event detection device 10 can detect the occurrence of a plurality of events. Further, the event detection device 10 notifies the delivery area information to the delivery device 20 without recognizing the network configuration where the delivery device 20 is located. Therefore, the event detection device 10 can specify the delivery area information from map information or the like that is in the public domain without need to specify information that can be known only by a telecommunications carrier, such as a place where a base station, an access point or the like is located. Further, the delivery device 20 can deliver event information to an area where the information should be delivered according to an event by determining a delivery destination node corresponding to the delivery area information.

In this manner, by using the information delivery system shown in FIG. 1, it is possible to make information delivery according to the occurrence of various events and further to determine a delivery destination of information for each event, which enables accurate delivery of information to an area in need of the information.

Figure 2:
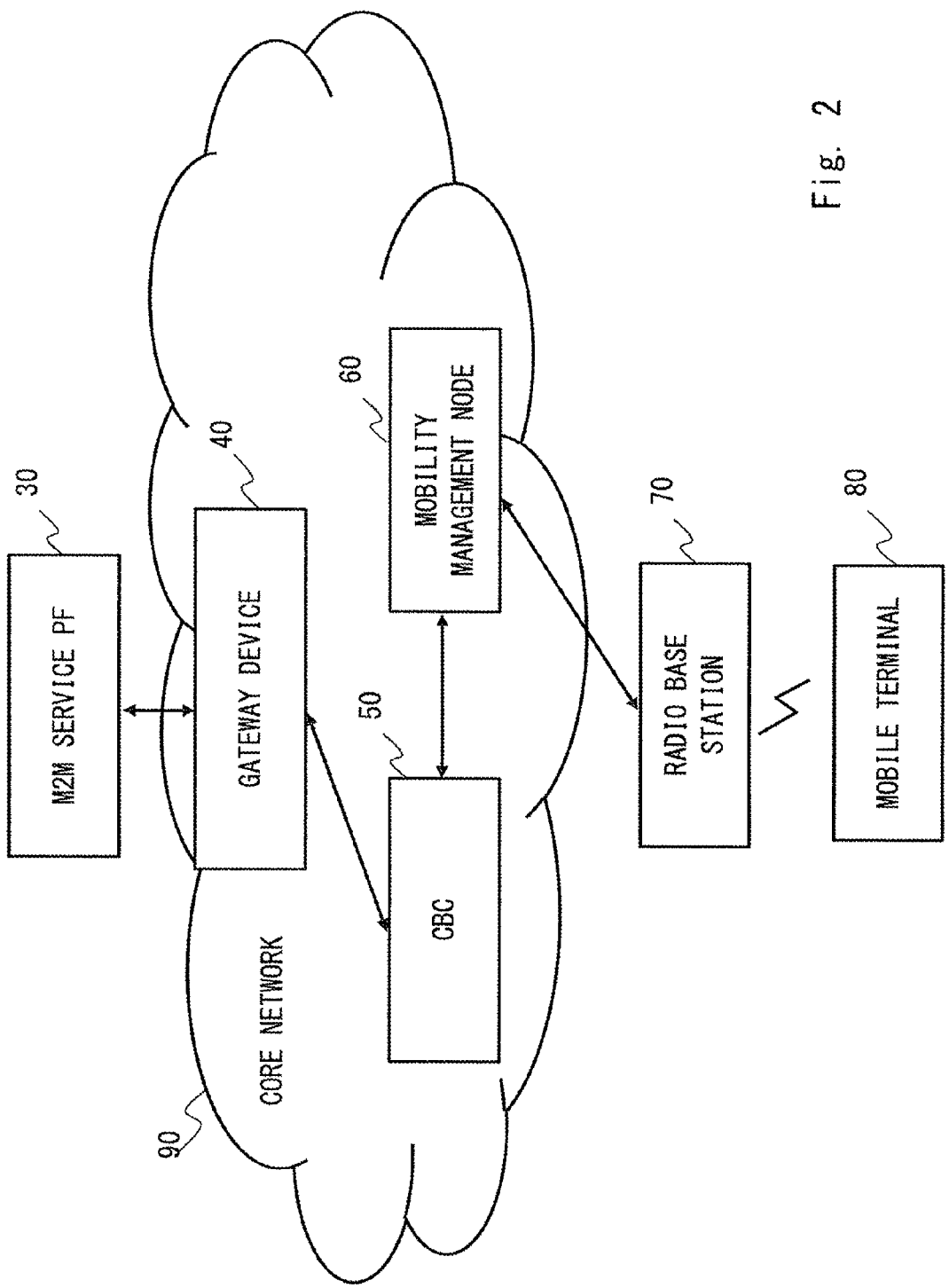
FIG. 2 is a block diagram of an information delivery system according to the first exemplary embodiment.

Next, a detailed configuration example of the information delivery system according to the first exemplary embodiment of the invention is described with reference to FIG. 2. The information delivery system in FIG. 2 includes a M2M (Machine to Machine) service PF 30, a gateway device 40, a CBC (Cell Broadcast Center) 50, a mobility management node 60, a radio base station 70, and a mobile terminal 80. The gateway device 40, the CBC 50 and the mobility management node 60 are located in a core network 90. The devices located in the core network 90 and the radio base station 70 are devices that are managed by a mobile telecommunications carrier. Therefore, the M2M service PF 30 may be a platform provided by an entity different from a mobile telecommunications carrier or a platform managed by a mobile telecommunications carrier.

The M2M service PF 30 corresponds to the event detection device 10 in FIG. 1. The M2M service PF 30 receives information about the occurrence of a natural disaster such as an earthquake or Tsunami, a fire, a traffic accident, a crime or the like through a computer located in an organization such as a government agency, a police station or a fire station. The M2M service PF 30 also receives information about the place where each event has occurred. The M2M service PF 30 determines delivery area information related to an area to deliver event information based on the place where the event has occurred. The M2M service PF 30 transmits a delivery request containing the event information and the delivery area information to the gateway device 40.

The gateway device 40 relays communication between the M2M service PF 30 and the devices in the core network 90. Specifically, the gateway device 40 has an interface for communication with an external network outside the core network 90 and further has an interface for communication with the devices in the core network 90. The gateway device 40 thereby functions as a gateway device with the external network. Further, the gateway device 40 may be configured using two devices: SCS (Service Capability Server) and MTC IWF. The configurations of the SCS and the MTC IWF are described in detail later. The gateway device 40 receives the delivery request transmitted from the M2M service PF 30.

The gateway device 40 specifies a delivery destination node corresponding to the received delivery area information. The gateway device 40 transmits a delivery request containing the event information and the specified delivery destination node information to the CBC 50.

The gateway device 40 may perform authentication as to whether the information transmitted from the M2M service PF 30 is allowed to be transferred into the core network 90. For example, when the gateway device 40 receives a delivery request for event information, it may determine whether the delivery request is related to an organization for which the event information is allowed to be transferred into the core network 90. In other words, the gateway device 40 may manage information about a list of organizations for which transfer of the delivery request is allowed. Alternatively, the gateway device 40 may manage information about a list of event information that can be transferred to a device in the core network 90.

Further, the gateway device 40 may perform determination as to whether or not to transfer the delivery request transmitted from the M2M service PF 30 to the CBC 50, which is a transfer destination of the delivery request, according to the processing load condition of the CBC 50. The gateway device 40 may receive information about the processing load from the CBC 50 on a regular basis or upon receiving a delivery request. The information about the processing load may be CPU utilization in the CBC 50, for example. Alternatively, the gateway device 40 may receive information about the processing load of the radio base station 70, the mobility management node 60 or the like, which is the delivery destination node, through the CBC 50.

When the processing load of the CBC 50, the radio base station 70, the mobility management node 60 or the like is high, the gateway device 40 may discard the delivery request transmitted from the M2M service PF 30 without transferring it. Alternatively, when the processing load of the CBC 50 or the radio base station is high, the gateway device 40 may specify and notify a retransmission time of the delivery request to the M2M service PF 30. Alternatively, the gateway device 40 may store the delivery request into a buffer and transmit the delivery request stored in the buffer to the CBC 50 after the lapse of a specified period of time. The gateway device 40 can thereby prevent an increase in the processing load of the CBC 50 or the delivery destination node such as the radio base station or the MME. In other words, the gateway device 40 can transmit the delivery request into the core network 90 in consideration of the congestion state of the core network 90 and the radio base station 70.

Further, the gateway device 40 may perform generation of billing information for billing an organization related to the event information when the delivery request is transmitted from the M2M service PF 30. For example, the gateway device 40 may notify identification information that identifies an organization related to the event information and the presence of the delivery request to a billing device or the like that performs billing processing in the core network 90 so that the billing device generates a billing profile. The billing device may be a CDF (Charging Data Function), CGF (Charging Gateway Function) or the like located in the network defined in the 3GPP, for example.

The CBC 50 transmits the delivery request to the mobility management node 60 based on the delivery destination node information notified from the gateway device 40. In the delivery destination node information, the mobility management node 60 as a delivery destination may be specified. Alternatively, in the case where the radio base station 70 as a delivery destination is specified in the delivery destination node information, the CBC 50 may extract the mobility management node 60 connected with the specified radio base station 70. In this case, the CBC 50 may manage the mobility management node 60 and the specified radio base station 70 using an information table or the like.

The mobility management node 60 receives the delivery request transmitted from the CBC 50. For example, the mobility management node 60 may be MME (Mobility Management Entity), which is a node of the core network defined in the 3GPP. The mobility management node 60 may be located in a network in units of prefectures or in units of regions smaller than the prefectures.

The mobility management node 60 transmits the event information contained in the received delivery request to a plurality of radio base stations 70 connected to the mobility management node 60. The mobility management node 60 may transmit the received event information to all of the connected radio base stations 70. Alternatively, in the case where the radio base station 70 as a delivery destination is specified from the CBC 50, the mobility management node 60 may transmit the received event information to the specified radio base station 70.

The radio base station 70 receives the event information transmitted from the mobility management node 60. The radio base station 70 transmits the received event information to the mobile terminal 80 that belongs to the area managed by the radio base station 70.

The mobile terminal 80 may be a mobile phone terminal, a smartphone terminal, a notebook personal computer or the like, a moving means such as a vehicle or a train with a communication function, or a machine worn by a user such as a watch with a communication function. Alternatively, the mobile terminal 80 may be a device such as a vending machine with a communication function that does not frequently move and is controlled through radio.

Further, although the gateway device 40 and the CBC 50 are different devices in the above description, the function implemented in the gateway device 40 may be implemented in the CBC 50, for example. In other words, the gateway device 40 and the CBC 50 may be located as an integrated device in the core network 90. Further, in the case where the gateway device 40 and the CBC 50 are different devices, the CBC 50 may determine a delivery destination node based on the delivery area information.

Configuration examples of SCS 40A and MTC IWF 40B according to the first exemplary embodiment of the invention are described hereinafter with reference to FIGS. 3A and 3B. The SCS 40A in FIG. 3A includes a service PF interface 41, a control unit 43, and a NW configuration information DB 45. The SCS 40A may be referred to as MTC Server.

The service PF interface 41 is used for communicating with the M2M service PF 30 and transmits and receives data to and from the M2M service PF 30. The service PF interface 41 receives a delivery request containing event information and delivery area information from the M2M service PF 30. The service PF interface 41 outputs the delivery request to the control unit 43. Alternatively, the service PF interface 41 may output the event information contained in the delivery request to a notification unit 44 of the MTC IWF 40B and output the delivery area information contained in the delivery request to the control unit 43.

The control unit 43 specifies a delivery destination node based on the delivery area information output from the service PF interface 41. The control unit 43 specifies a delivery destination node using the NW configuration information DB 45.

A configuration example of the NW configuration information DB 45 is described hereinafter with reference to FIG. 4. The NW configuration information DB 45 manages area information and base stations that belong to the area in association with each other. For example, an area A and base stations eNB#1, eNB#2 and eNB#3 that belong to the area A are associated with each other. Further, an area B and base stations eNB#4, eNB#5 and eNB#6 that belong to the area B are associated with each other. Further, an area C and base stations eNB#7 and eNB#8 that belong to the area C are associated with each other. The area C may be specified as "along Route X", for example. Further, as the area information, a range of several kilometers on an expressway may be specified.

The eNB is the name of a radio base station that is used in LTE defined in the 3GPP. Although eNB is used as an example of a base station in this figure, a radio base station used in a different communication system from LTE, such as a radio base station used in a W-CDMA wireless system, and area information may be associated with each other.

Further, although an example in which area information and base stations are managed in association with each other is described in this figure, area information and a node in the core network such as a mobility management node may be managed in association with each other, for example. Further, area information, a node in the core network and base stations may be managed in association with one another.

Referring back to FIG. 3, the control unit 43 extracts the base stations associated with the delivery area information output from the service PF interface 41. The control unit 43 outputs delivery destination node information related to the extracted base stations and event information to the notification unit 44 of the MTC IWF 40B.

Figure 3A:
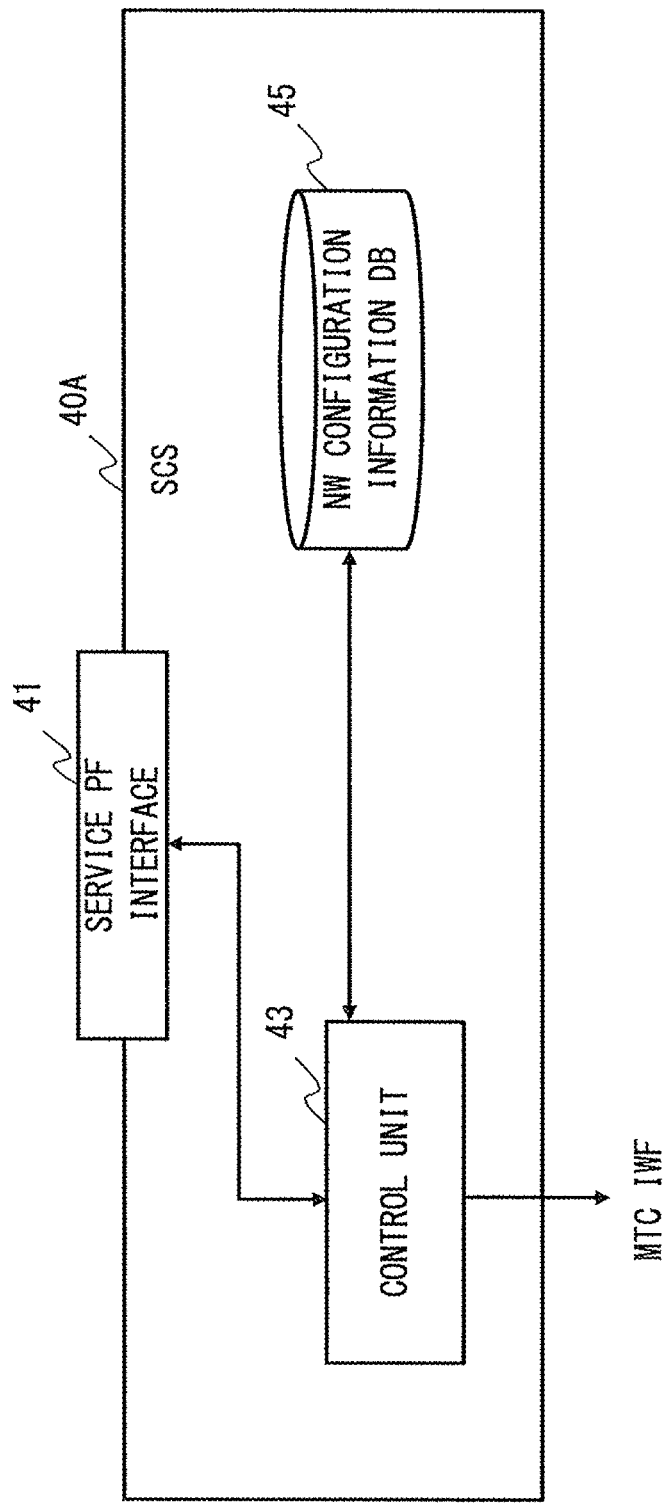
FIG. 3A is a block diagram of SCS according to the first exemplary embodiment.
Figures 3B, 4:
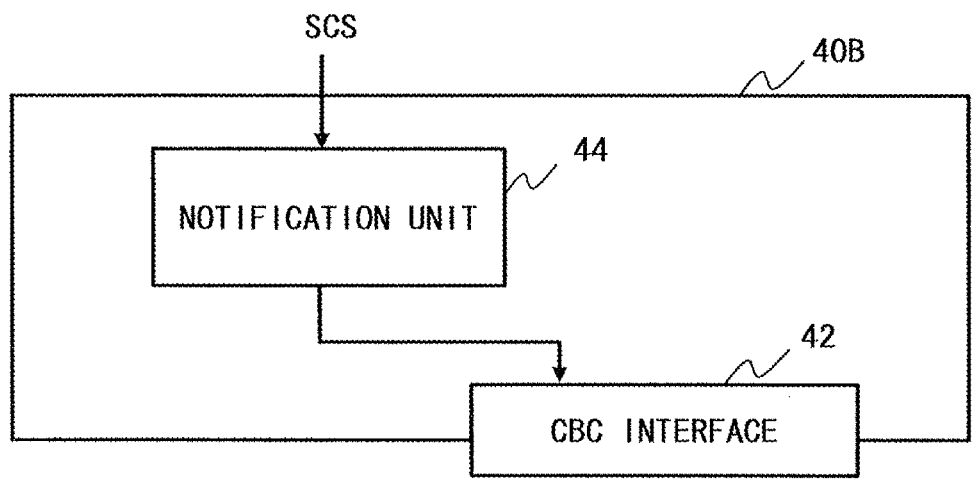
FIG. 3B is a block diagram of MTC IWF according to the first exemplary embodiment.
FIG. 4 is a block diagram of a NW configuration information DB according to the first exemplary embodiment.

A configuration example of the MTC IWF 40B shown in FIG. 3B is described hereinafter. The MTC IWF 40B includes the notification unit 44 and a CBC interface 42. The notification unit 44 transmits a delivery request containing the event information and the delivery destination node information output from the control unit 43 of the SCS 40A to the CBC 50 through the CBC interface 42. Alternatively, the notification unit 44 transmits a delivery request containing the delivery destination node information output from the control unit 43 of the SCS 40A and the event information output from the service PF interface 41 of the SCS 40A to the CBC 50 through the CBC interface 42.

The CBC interface 42 is used for communicating with the CBC 50 and transmits and receives data to and from the CBC 50.

A sequence showing a flow of signals between the M2M service PF 30 and the CBC 50 in the information delivery system according to the first exemplary embodiment of the invention is described hereinafter with reference to FIG. 5. First, the M2M service PF 30 receives event information such as a natural disaster like an earthquake or Tsunami, a fire, a traffic accident or a crime and information about the place where the event has occurred through a computer located in an organization such as a government agency, a police station or a fire station (S11).

Next, the M2M service PF 30 transmits a delivery request containing the event information and information about a delivery area to the SCS 40A (S12). The SCS 40A receives the delivery request transmitted from the M2M service PF 30 and transmits it to the MTC IWF 40B (S13). In this figure, the SCS 40A and the MTC IWF 40B are illustrated as different devices. This is on the ground that the SCS 40A and the MTC IWF 40B are different devices in the network configuration defined in the 3GPP. The network configuration defined in the 3GPP is described in detail later.

The MTC IWF 40B specifies a delivery destination node based on the delivery area information. The delivery destination node is specified using the NW configuration information DNB 45 as described above. The MTC IWF 40B transmits information about the specified delivery destination node and the event information to the CBC 50 (S14).

In UE, information for determining whether to receive information delivered in an emergency situation (emergency delivery necessity information) may be notified to the CBC 50. For example, in LTE, the emergency delivery necessity information may be set together with a disaster type or the like to Warning Type, Warning Message or the like. Further, in 3G, the emergency delivery necessity information may be set together with a disaster type or the like to Message ID, Serial Number or the like. Further, the emergency delivery necessity information may be set to another parameter or message. The emergency delivery necessity information may be contained in any of the messages transmitted in Steps S12, S13 and S14.

For example, the emergency delivery necessity information may be information for determining whether only an MTC device should receive the information or an MTC device should not receive the information (or discard it). The MTC device is a device included in a UE and used for MTC defined as machine communication. The MTC and the MTC device are defined in the 3GPP technical specification. The CBC 50 may receive a flag indicating whether it is for the MTC device as the emergency delivery necessity information.

Alternatively, the CBC 50 may determine that all of the information transmitted from the MTC IWF 40B are for the MTC device. In this case, the emergency delivery necessity information is not needed.

Figure 6:
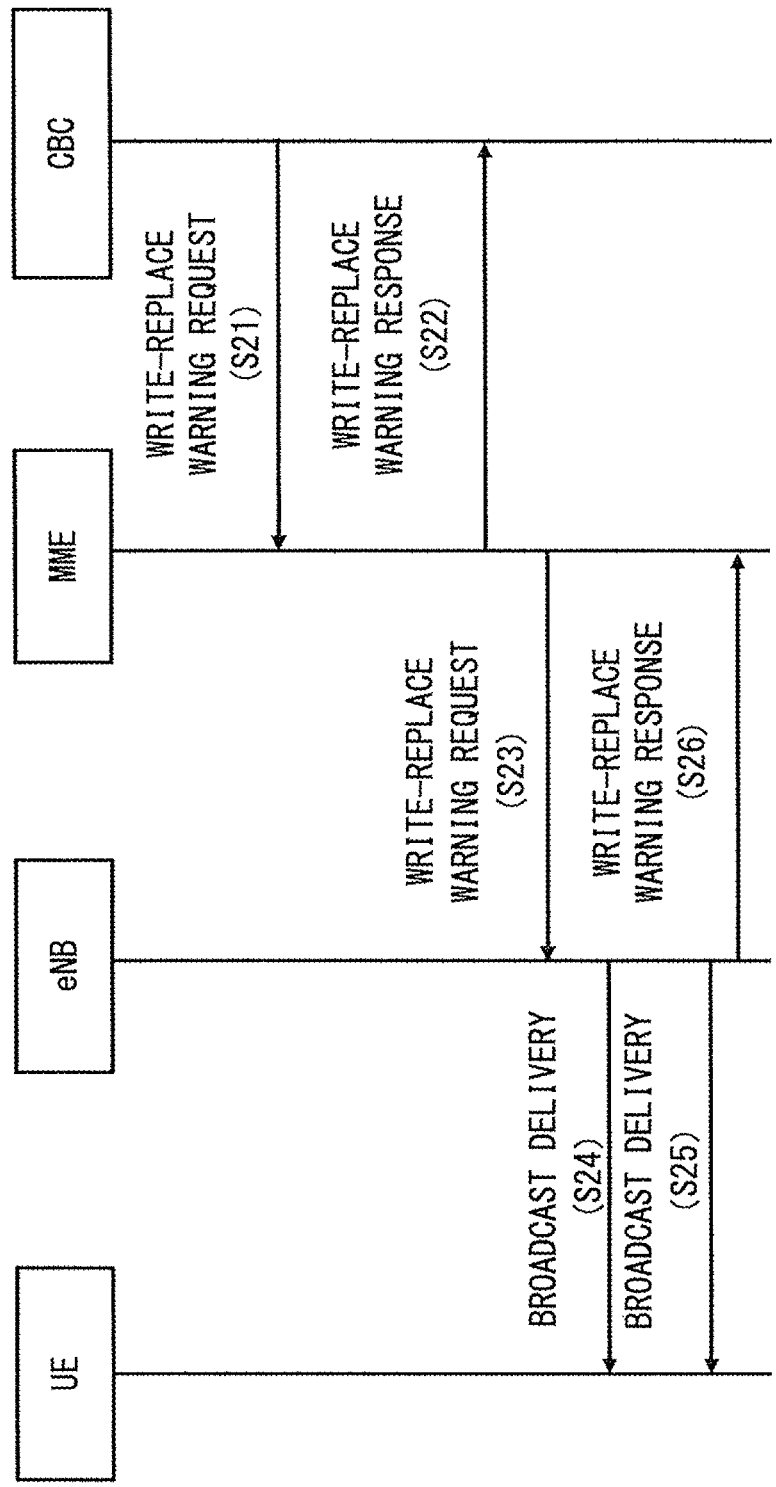
FIG. 6 is a sequence chart showing a flow of signals in the information delivery system according to the first exemplary embodiment.

A sequence showing a flow of signals between the CBC 50 and the mobile terminal 80 in the information delivery system is described hereinafter with reference to FIG. 6. The sequence in this figure shows the flow of signals in the network defined in the 3GPP. Information delivery between the CBC 50 and the mobile terminal 80 is performed using the emergency information delivery system.

Figure 5:
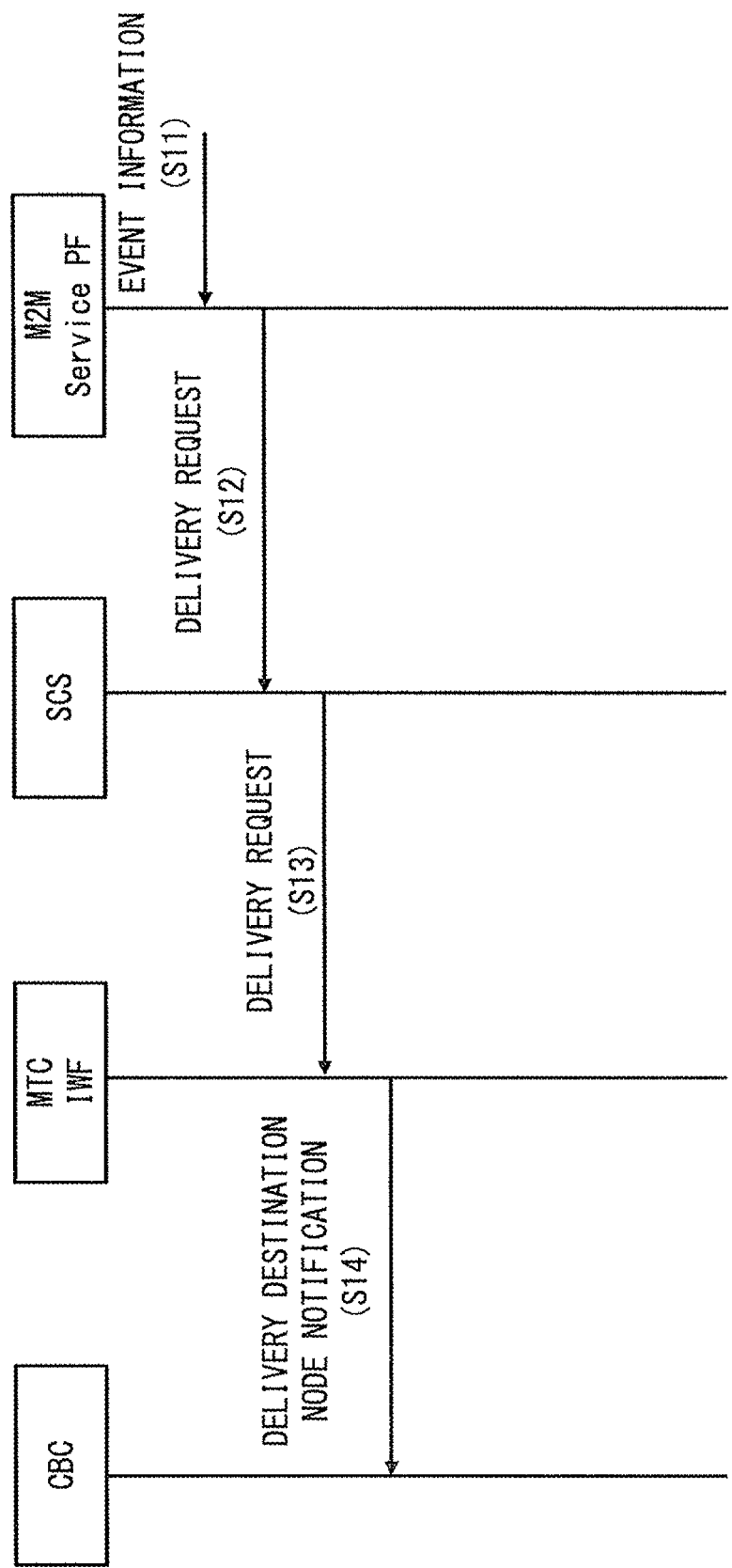
FIG. 5 is a sequence chart showing a flow of signals in the information delivery system according to the first exemplary embodiment.

First, when the delivery destination node is notified in Step S14 of FIG. 5, the CBC 50 transmits WRITE-REPLACE WARNING REQUEST to the MME (S21). WRITE-REPLACE WARNING REQUEST contains TAI, Warning Area List, Extended Repetition Period, Warning Type, Warning Message Contents and the like. TAI is the abbreviated name for Tracking Area Identity indicating a position registration area. When TAI is contained in WRITE-REPLACE WARNING REQUEST, the MME delivers information to cells or base stations that belong to the same TAI. Further, the CBC 50 sets information (flag) as to whether it is for the MTC device to Warning Type or Warning Message.

Next, when the MME receives WRITE-REPLACE WARNING REQUEST, it transmits WRITE-REPLACE WARNING RESPONSE to the CBC 50 as a response signal (S22). Then, when the MME receives TAI in Step S21, it transmits WRITE-REPLACE WARNING REQUEST to the eNB that belongs to the received TAI (S23). When the MME does not receive TAI in Step S21, it may transmit WRITE-REPLACE WARNING REQUEST to all of the eNBs under its control.

Then, the eNB delivers the information set to WRITE-REPLACE WARNING REQUEST to a plurality of UEs under its control through broadcast (S24 and S25). In LTE ETWS, a first report (paging) called primary notification is sent as emergency delivery (S24), and then a second report called secondary notification is sent for detailed information (S25). For example, by adding the emergency delivery necessity information to the first report, the UE can determine whether the broadcast delivery is addressed to its own device or not. When the emergency delivery necessity information indicating that it is for the MTC device is set to the first report, the UE that is not the MTC device determines that the broadcast delivery is not addressed to its own device. In this case, the UE that is not the MTC device can discard the second report containing the detailed information. On the other hand, when the emergency delivery necessity information indicating that it is not for the MTC device is set to the first report, the MTC device determines that the broadcast delivery is not addressed to its own device. In this case, the MTC device can discard the second report containing the detailed information. Therefore, the MTC device and the UE that is not the MTC device do not need to perform unnecessary data processing and thus not need to unnecessarily use resources for data processing.

Then, the eNB transmits WRITE-REPLACE WARNING RESPONSE as a response signal to the MME (S26).

As described above, by using the M2M service PF 30 according to the first exemplary embodiment of the invention, it is possible to detect an event related to an organization such as a government agency, a police station or a fire station. Thus, by using the information delivery system according to the first exemplary embodiment of the invention, it is possible to deliver event information in response to a request from a plurality of organizations such as a government agency, a police station and a fire station.

Further, in the gateway device 40, by using the NW configuration information DB 45, it is possible to determine a delivery destination node for each event information. It is thereby possible to determine a delivery area arbitrarily for each of a plurality of organizations such as a government agency, a police station and a fire station and transmit necessary information to an necessary area.

Further, by using the CBC 50, it is possible to deliver the event information to the mobile terminal 80 using the existing emergency information delivery system. It is thereby possible to eliminate the need for constructing a new network and prevent an increase in cost required for delivery of the event information.

Second Exemplary Embodiment

A configuration example of SCS 40A_1 according to a second exemplary embodiment of the invention is described hereinafter with reference to FIG. 7. The SCS 40A_1 includes a service PF interface 41, a control unit 43, a NW configuration information DB 45 and a priority information DB 46. The elements other than the priority information DB 46 are the same as those of FIG. 3A and detailed description thereof is omitted.

The priority information DB 46 specifies a priority for each of an organization such as a government agency, a police station or a fire station. Specifically, in the priority information DB 46, priorities are set so that, when event information or the like is notified at the same time from a plurality of organizations such as a government agency, a police station and a fire station, the event information or the like from an organization for which a high priority is set is delivered by priority. The case where event information or the like is notified at the same time includes the case where a plurality of event information or the like are notified within a specified period of time. For example, the case where event information or the like is notified at the same time includes the case where a plurality of event information are notified one after another during several seconds.

A configuration example of the priority information DB 46 is described hereinafter with reference to FIG. 8. The priority information DB 46 is made up of information related to business entities and information related to priorities. The business entities are organizations such as a government agency, a police station and a fire station, which are shown as business entities A to C in this figure. A priority_1 to a priority_3 are set as the priorities. The priority_1 is the highest priority level, and the priority level is lower as the number increases. As a matter of course, the priority level may be high when the number is large, and the priority level may is lower as the number decreases. In this figure, the priority_1 is set for the business entity A, the priority_2 is set for the business entity B, and the priority_3 is set for the business entity C. Thus, the business entity A has the highest priority and the business entity C has the lowest priority.

A sequence showing a flow of signals between the M2M service PF 30 and the CBC 50 in the information delivery system according to the second exemplary embodiment of the invention is described hereinafter with reference to FIG. 9. First, the M2M service PF 30 receives a notification of event information 1 from the business entity A (S31). Next, the M2M service PF 30 notifies a delivery request 1 to the SCS 40A_1 (S32). Likewise, the M2M service PF 30 receives a notification of event information 2 from the business entity B (S33) and then notifies a delivery request 2 to the SCS 40A_1 (S34), and receives a notification of event information 3 from the business entity (S35) and then notifies a delivery request 3 to the SCS 40A_1 (S36). The delivery requests 1 to 3 contain the identifier of the corresponding business entity.

Then, in the case where the SCS 40A_1 receives the delivery requests 1 to 3 within a specified period of time, it performs priority determination on each of the delivery requests (S37). The SCS 40A_1 performs priority determination using the priority information DB 46. Referring to FIG. 8, the delivery request 1 transmitted based on the event information 1 from the business entity A has the highest priority. Therefore, the SCS 40A_1 transmits the delivery request 1 to the MTC IWF 40B (S38). The processing of Step S39 is the same as Step S14 in FIG. 5 and thus not redundantly described.

In Step S37, the SCS 40A_1 may discard the delivery requests 2 and 3 other than the delivery request 1 to be notified to the MTC IWF 40B. In this case, the SCS 40A_1 may notify each business entity that the delivery request has been discarded through the M2M service PF 30 and make a request for retransmission to notify the event information again after the lapse of a specified period of time. Alternatively, in Step S37, the SCS 40A_1 may accumulate the delivery requests 2 and 3 in a buffer and transmit the delivery request 2 to the MTC IWF 40B after the lapse of a specified period of time and then further transmit the delivery request 3 to the MTC IWF 40B after the lapse of a specified period of time. In other words, the SCS 40A_1 may transmit the delivery requests at regular time intervals in order of priority.

Figure 9:
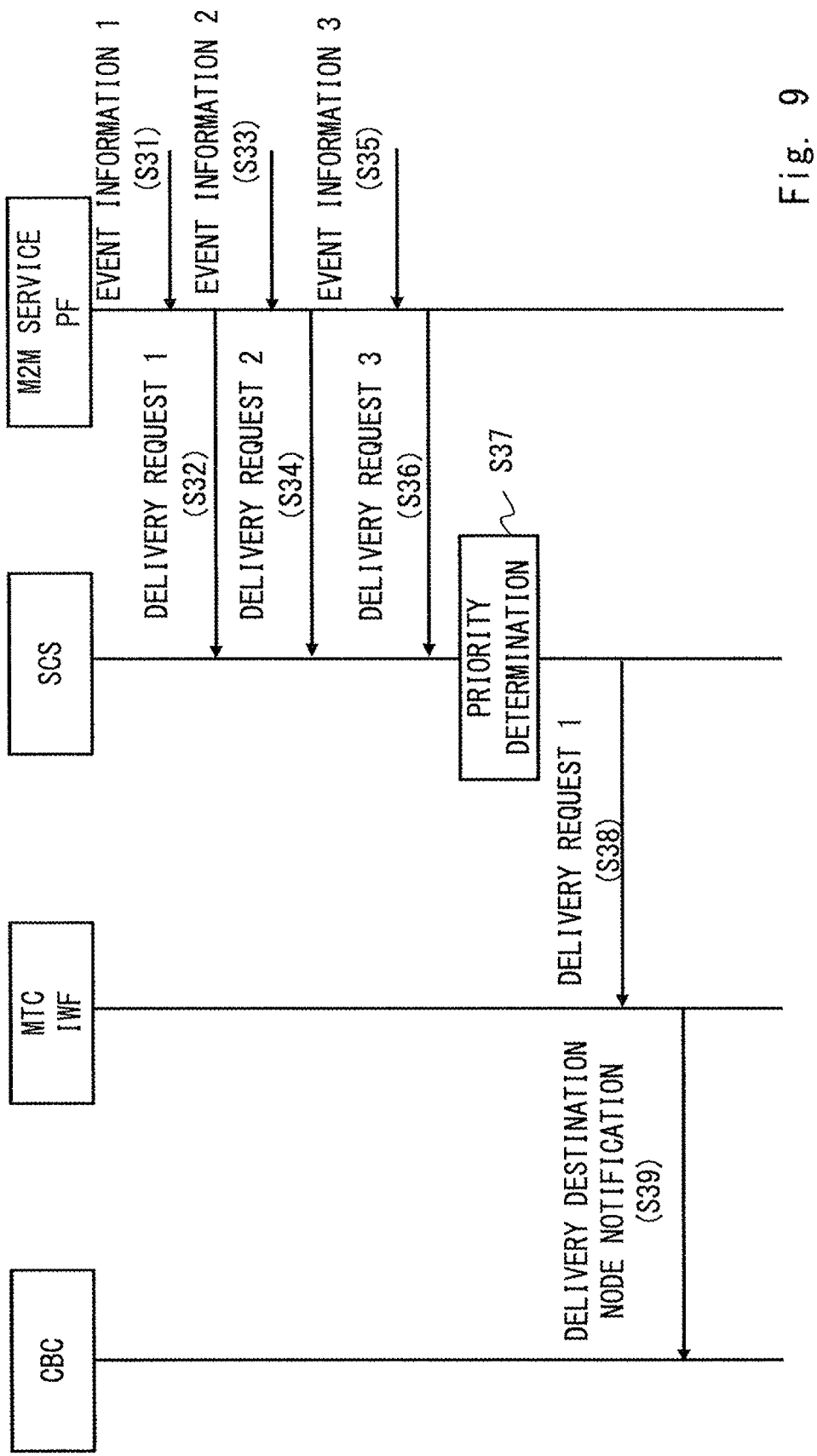
FIG. 9 is a sequence chart showing a flow of signals in an information delivery system according to the second exemplary embodiment.

Although the case where the SCS 40A_1 receives event information of a plurality of business entities from one M2M service PF 30 is described in FIG. 9, the present invention may be applied in the same manner also in the case where it receives event information of a plurality of business entities from a plurality of M2M services PF 30, for example.

Another example of the case where a plurality of delivery requests are notified from the M2M service PF 30 is described with reference to FIG. 10. Steps S41 to S46 are the same as Steps S31 to S36 in FIG. 9 and thus not redundantly described. In Steps S42, S44 and S46, when the SCS 40A_1 receives a plurality of delivery requests within a specified period of time, it generates one delivery request message by putting the plurality of delivery requests together and notifies the generated one delivery request message to the MTC IWF 40B (S47). The one delivery request message contains the delivery area information and the event information of the delivery requests 1 to 3.

Then, the MTC IWF 40B specifies a delivery destination node for each of the delivery requests and notifies the specified delivery destination node to the CBC 50 (S48).

As described above, by using the SCS 40A_1 according to the second exemplary embodiment of the invention, it is possible to deliver event information based on priorities even in the case of receiving a plurality of delivery requests within a specified period of time. It is thereby possible to process an emergency message or the like with a high priority in preference to other event information, for example, to deliver necessary information without fail.

Figure 10:
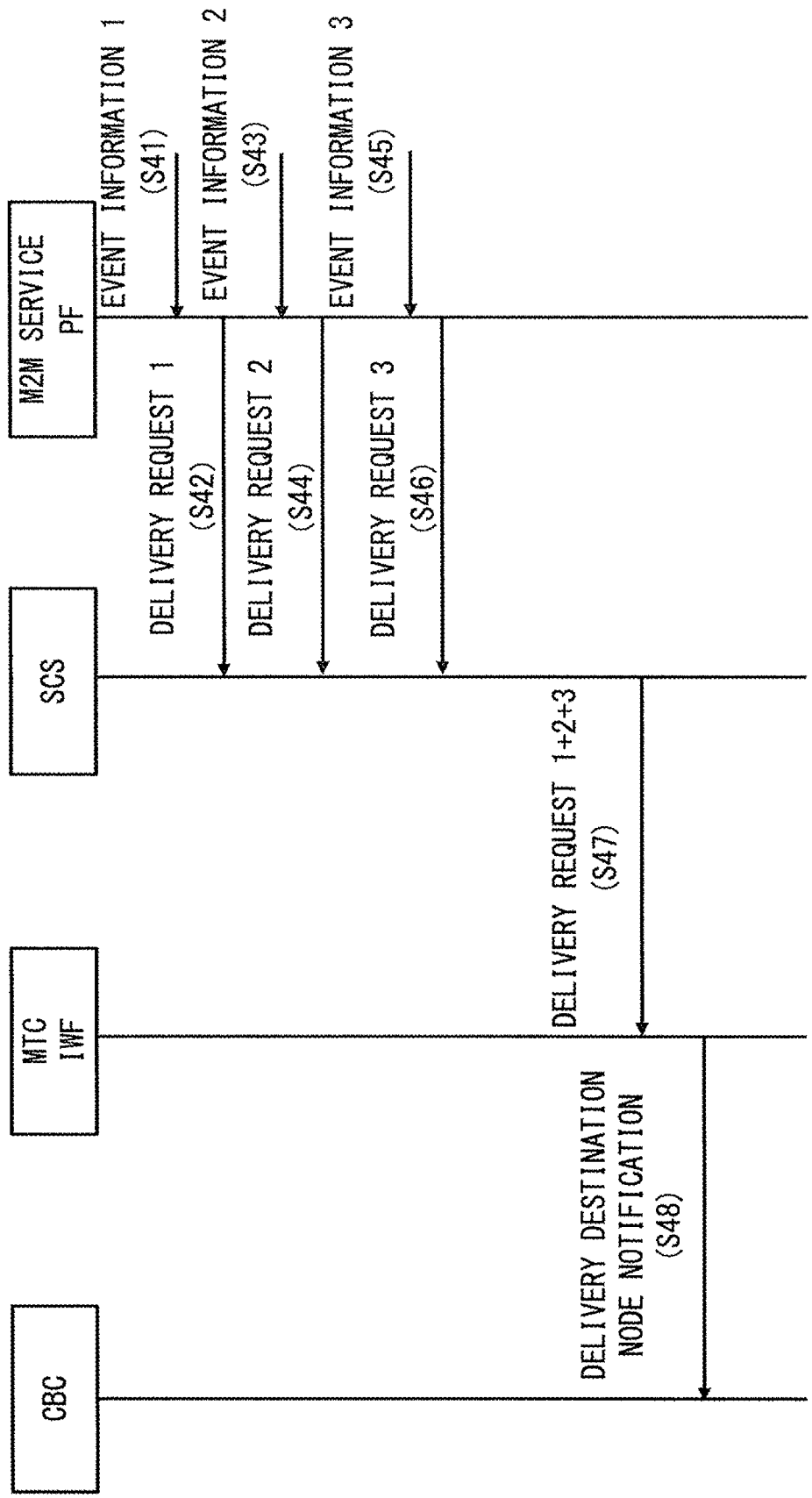
FIG. 10 is a sequence chart showing a flow of signals in the information delivery system according to the second exemplary embodiment.

Further, as described in FIG. 10, by putting a plurality of delivery requests 1 to 3 together into one delivery request in the SCS 40A_1 for the MTC IWF 40B, it is possible to process a plurality of delivery requests at a time. It is thereby possible to deliver a delivery request received from the M2M service PF 30 without discarding it.

Third Exemplary Embodiment

A configuration example of SCS 40A_2 according to a third exemplary embodiment of the invention is described hereinafter with reference to FIG. 11. The SCS 40A_2 includes a service PF interface 41, a control unit 43, a NW configuration information DB 45, and a data format information DB 47. The elements other than the data format information DB 47 are the same as those of FIG. 3A and detailed description thereof is omitted.

The data format information DB 47 manages delivery contents and the data format of the delivery contents in association with each other. A configuration example of the data format information DB 47 is described hereinafter with reference to FIG. 12. The data format information DB 47 manages delivery contents and a data format in association with each other. For example, when delivering text information, a text message is used as a data format. When delivering route information, map data is used as a data format. Further, when controlling the operation of a device such as a mobile communication device at a delivery destination, a device control signal is delivered as a data format. For example, the route information is used to notify a route or the like along which an emergency vehicle travels from an accident site to a hospital or the like to vehicles or the like traveling near the route. Further, for example, the control of the device operation may be turning ON/OFF the power of the device.

Referring back to FIG. 11, when the control unit 43 receives a delivery request from the service PF interface 41, it extracts the delivery contents of the event information set to the delivery request. The control unit 43 specifies the data format corresponding to the delivery contents using the data format information DB 47. The control unit 43 notifies information about the specified data format to the notification unit 44 of the MTC IWF 40B.

As described above, by using the data format information DB 47 in the SCS 40A_2 according to the third exemplary embodiment of the invention, it is possible to deliver various information, not limited to text information. In addition to the contents shown in FIG. 12, a data format may be specified for image information, video information and the like.

Figure 7:
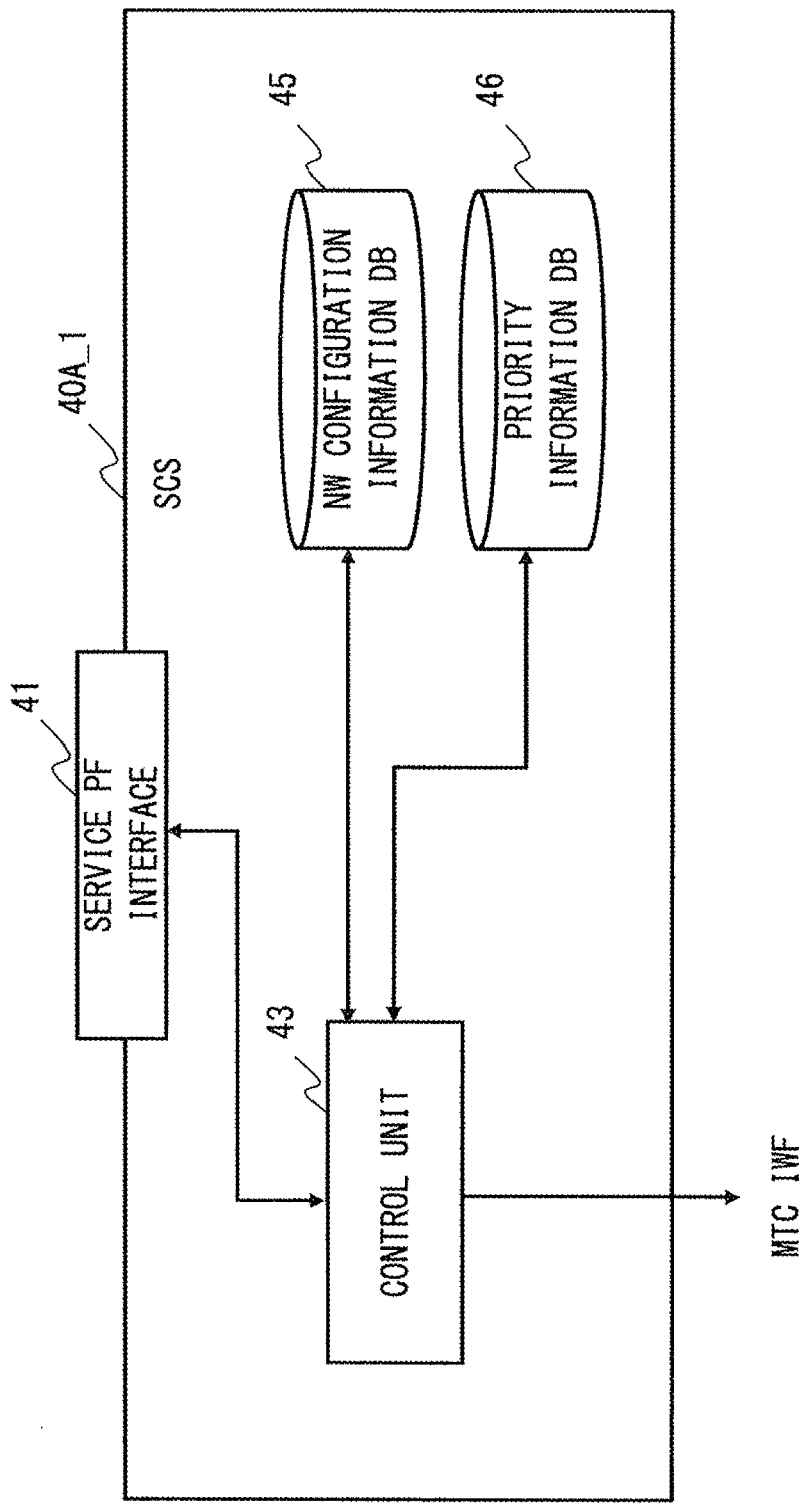
FIG. 7 is a block diagram of SCS according to a second exemplary embodiment.
Figure 11:
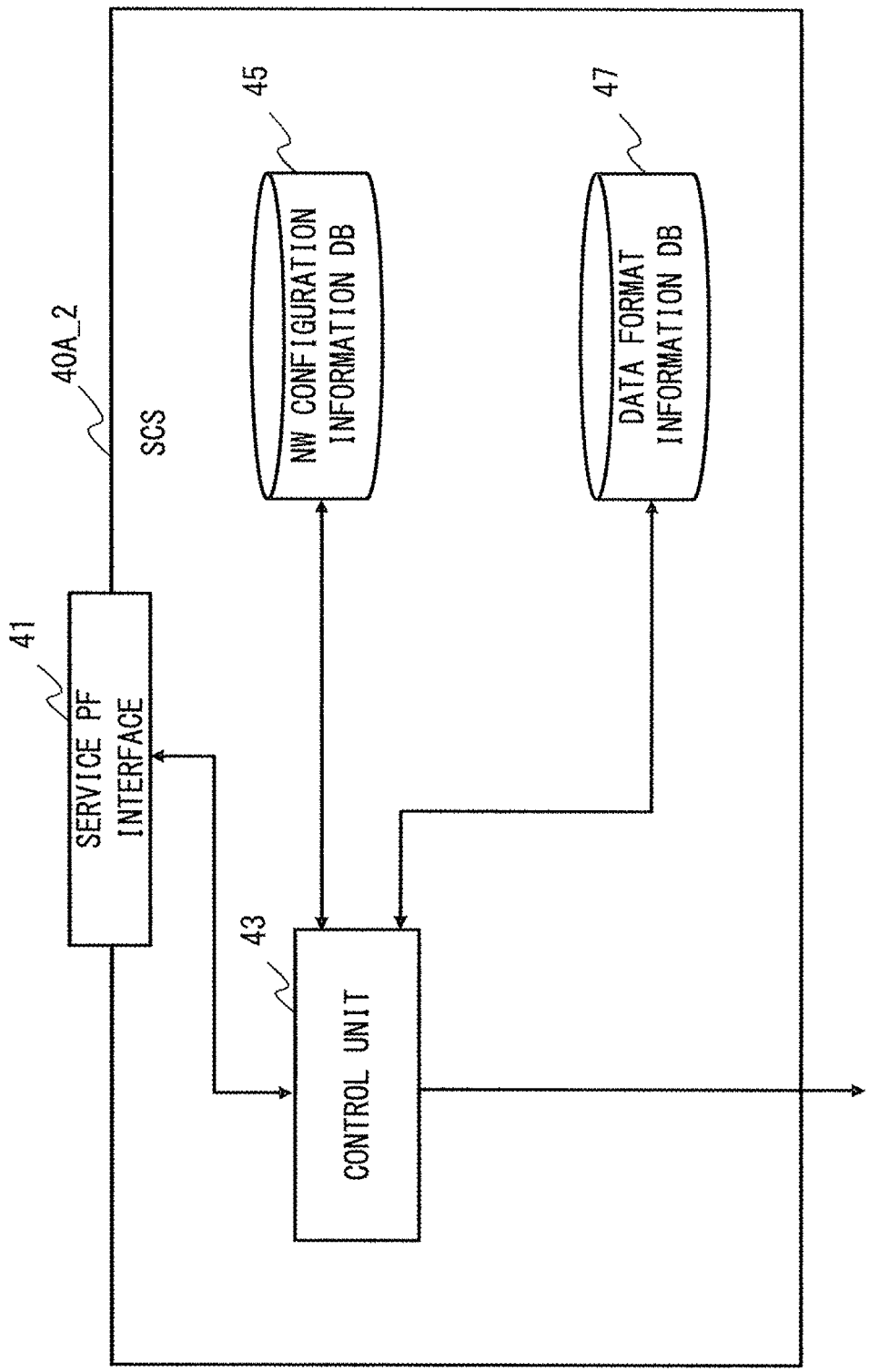
FIG. 11 is a block diagram of SCS according to a third exemplary embodiment.

Further, although the configuration in which the data format information DB 47 is added to the configuration of the SCS 40 of FIG. 3A is illustrated in FIG. 11, the data format information DB 47 may be added to the configuration of the SCS 40A_1 of FIG. 7.

Fourth Exemplary Embodiment

Figure 13:
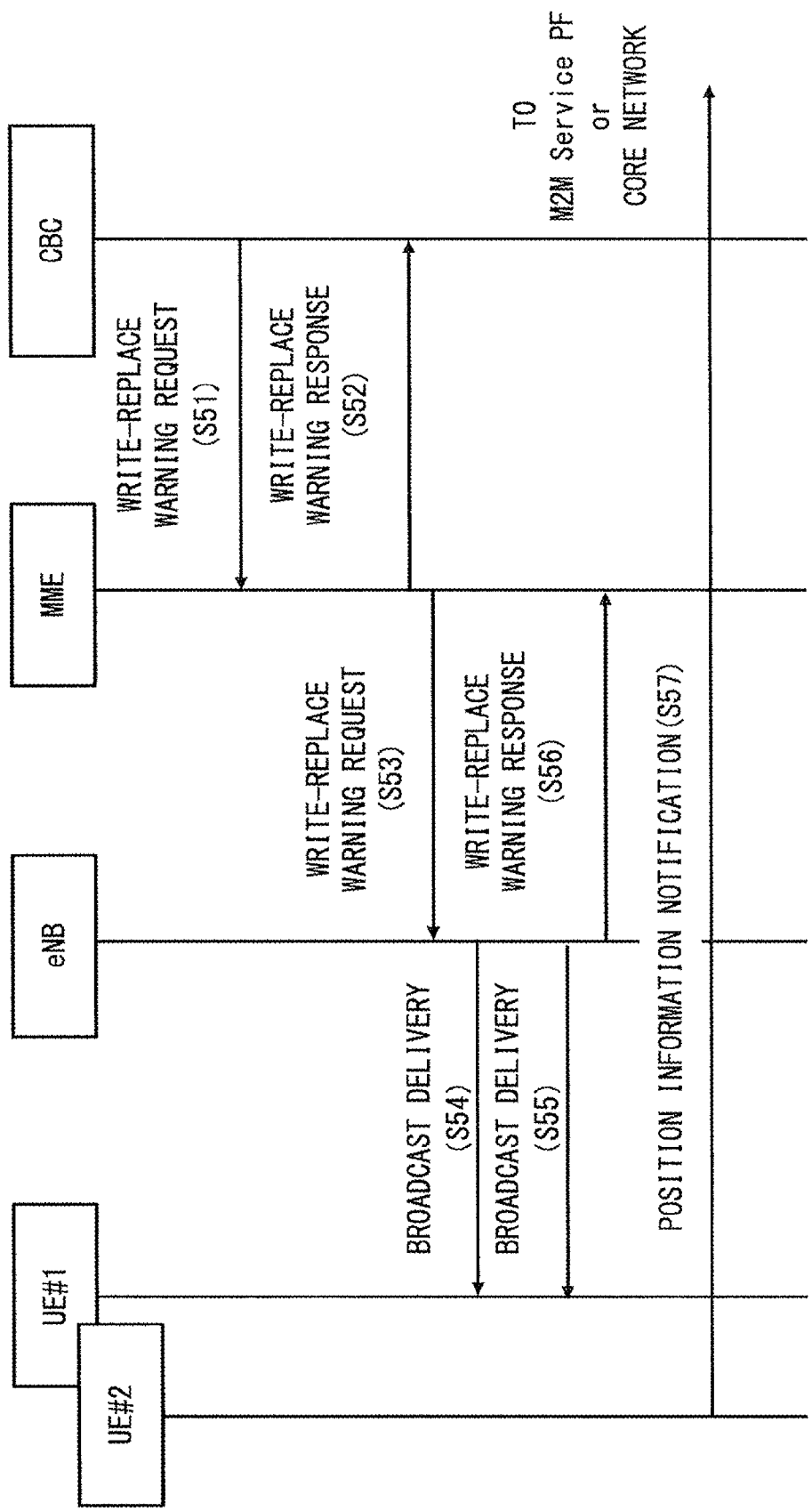
FIG. 13 is a sequence chart showing a flow of signals in an information delivery system according to a fourth exemplary embodiment.

A sequence showing a flow of signals between the CBC 50 and the mobile terminal 80 in the information delivery system according to a fourth exemplary embodiment of the invention is described hereinafter with reference to FIG. 13. A flow of a process in the case where an information delivery area changes in a short time, such as when delivering information in the range of several kilometers from a moving emergency vehicle, is described using FIG. 13. The processing in Steps S51 to S56 is the same as the processing in Steps S21 to S26 in FIG. 6 and thus detailed description thereof is omitted.

It is assumed that UE#1 is a terminal that is located within the range of several kilometers from an emergency vehicle and uses a broadcast delivery service, and UE#2 is a terminal that is mounted on the emergency vehicle. After Step S55, a position information notification is sent from the UE#2 on the emergency vehicle to the M2M service PF 30 in order to notify a change in position information (S57). When the position information of the UE#2 is changed, the M2M service PF 30 sets new delivery area information and notifies it to the SCS 40. The processing of FIG. 5 is repeated after that.

Further, the UE#2 may send a position information notification that notifies a change in position information to MME, HSS (subscriber information management device) or the like, which is a device that manages position information in the core network 90 (S57). When the position information of a mobile communication device such as the UE#2 is changed, the MME, HSS or the like in the core network 90 is updated, and the latest position information is stored. The CBC 50 may receive the latest position information of the UE#2 from the MME, HSS or the like and determine a delivery destination node of event information.

As described above, by using the information delivery system according to the fourth exemplary embodiment of the invention, the following effect is obtained. The M2M service PF 30 receives position information of a mobile communication device at the center position of information delivery and can thereby change the delivery area according to the received position information. It is thereby possible to change the information delivery area within a short period of time. Further, the CBC 50 can change the information delivery area within a short period of time also by receiving the latest position information of the mobile communication device at the center position of information delivery from a device such as MME or HSS in the core network.

When the M2M service PF 30 receives position information from the UE#2, the following effect is also obtained. For example, there is a case where the UE#2 enters Idle mode and a connection state of a physical link with eNB or the like is disconnected. In such a case, even in the case where the position information of the UE#2 is changed, MME, HSS or the like cannot be informed of the change in the position information of the UE#2. On the other hand, if the UE#2 notifies the position information to the M2M service PF 30 as application information, it is possible to notify a change in position information.

Further, when the CBC 50 receives the latest position information from MME, HSS or the like, the following effect is also obtained. In this case, a change in position information is notified using a control message or the like in the core network 90. Therefore, position information change processing can be done earlier than the case where position information is notified as application information. The CBC 50 can thereby determine a delivery destination node earlier than the case of receiving updated delivery area information from the M2M service PF 30.

Other Exemplary Embodiments

A network system in the case of applying the SCS 40A, the MTC IWF 40B and the CBC50 according to the first to fourth exemplary embodiments described above to the network defined in the 3GPP technical specification is described with reference to FIG. 14.

Figure 14:
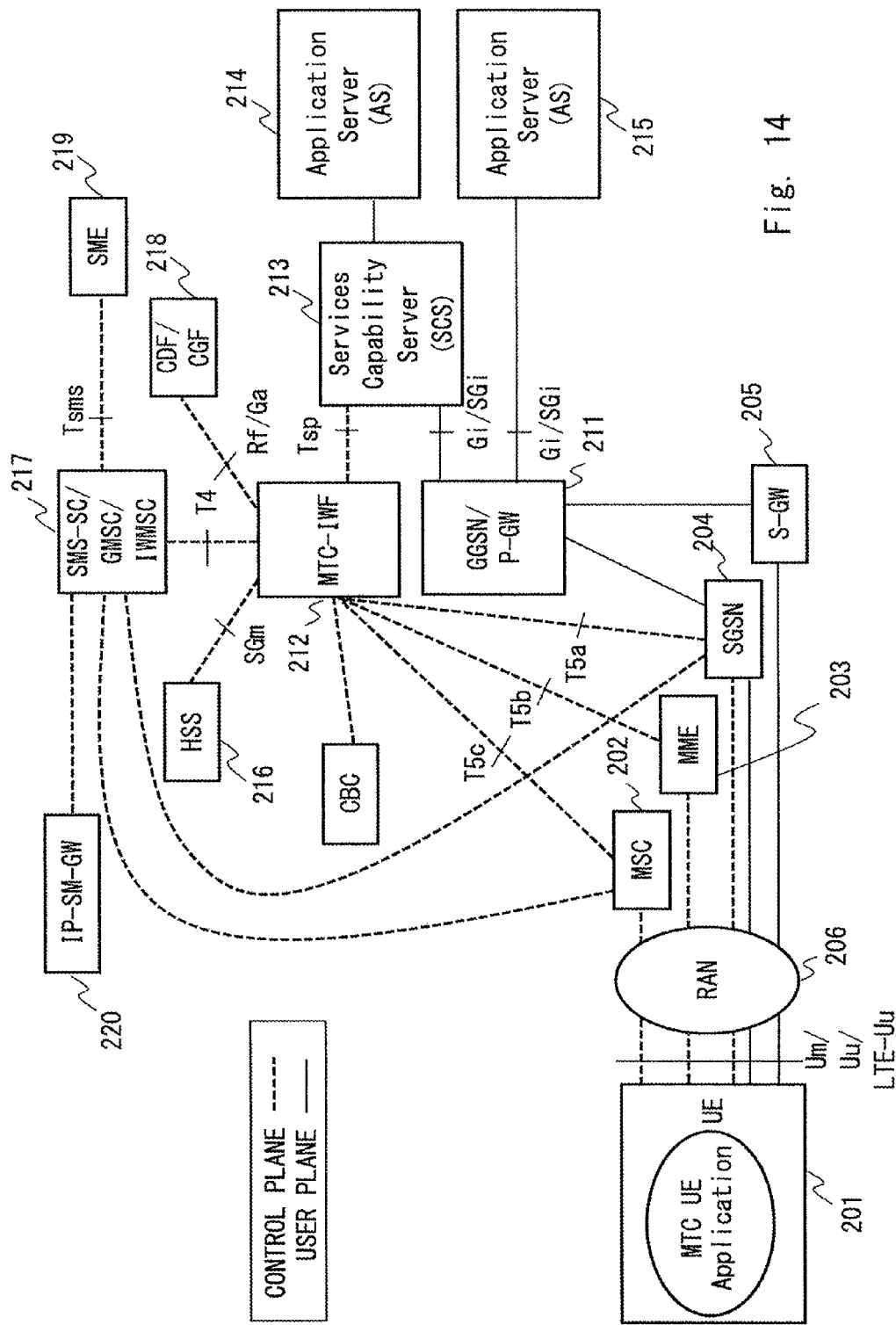
FIG. 14 is a diagram showing a network configuration defined in 3GPP.

The network system in FIG. 14 includes UE (User Equipment) 201, RAN (Radio Access Network) 206, MSC (Mobile Switching Center) 202, MME 203, SGSN (Serving GPRS Support Node) 204, S-GW 205, GGSN (Gateway GPRS Support Node)/P-GW 211, MTC-IWF 212, SCS 213, AS (Application Server) 214 and 215, HSS 216, SMS-SC (Short Message Service-Service Center)/GSM (registered trademark) SC/IWMSC 217, CDF (Charging Data Function)/CGF (Charging Gateway Function) 218, SME (Short Message Entity) 219 and IP-SM-GW 220.

The MTC-IWF 212 and the SCS 213 are placed to relay communication among the MSC 202, the MME 203, the SGSN 204 and the AS 214. The AS 214 is placed in an external communication network different from a mobile communication network. The MTC-IWF 212 is placed in the mobile communication network. The SCS 213 may be placed in any one of the mobile communication network and the external communication network. Thus, the location of the SCS 213 depends on a network design policy of a telecommunications carrier, an AS company or the like.

Further, the MTC-IWF 212 and the CBC 111 are connected to provide information delivery in response to a plurality of events notified from different organizations using the emergency information delivery system.

Although the present invention is described as a hardware configuration in the above exemplary embodiments, the present invention is not limited thereto. The present invention may be implemented by causing a CPU (Central Processing Unit) to execute a computer program to perform processing of the control unit in the gateway device 40.

In the above example, the program can be stored and provided to the computer using any type of non-transitory computer readable medium. The non-transitory computer readable medium includes any type of tangible storage medium. Examples of the non-transitory computer readable medium include magnetic storage media (such as floppy disks, magnetic tapes, hard disk drives, etc.), optical magnetic storage media (e.g. magneto-optical disks), CD-ROM (Read Only Memory), CD-R, CD-R/W, and semiconductor memories (such as mask ROM, PROM (Programmable ROM), EPROM (Erasable PROM), flash ROM, RAM (Random Access Memory), etc.). The program may be provided to a computer using any type of transitory computer readable medium. Examples of the transitory computer readable medium include electric signals, optical signals, and electromagnetic waves. The transitory computer readable medium can provide the program to a computer via a wired communication line such as an electric wire or optical fiber or a wireless communication line.

The present invention is not limited to the above-described exemplary embodiments, and various changes and modifications may be made without departing from the scope of the invention.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2012-101826, filed on Apr. 26, 2012, the disclosure of which is incorporated herein in its entirety by reference.

REFERENCE SIGNS LIST

10 EVENT DETECTION DEVICE
20 DELIVERY DEVICE
30 M2M SERVICE PF
40 GATEWAY DEVICE
40A SCS
40A_1 SCS
40A_2 SCS
40B MTC IWF
41 SERVICE PF INTERFACE
42 CBC INTERFACE
43 CONTROL UNIT
44 NOTIFICATION UNIT
45 NW CONFIGURATION INFORMATION DB
46 PRIORITY INFORMATION DB
47 DATA FORMAT INFORMATION DB
50 CBC
60 MOBILITY MANAGEMENT NODE
70 RADIO BASE STATION
80 MOBILE TERMINAL
90 CORE NETWORK
201 UE
202 MSC
203 MME
204 SGSN

205 S-GW
206 RAN
211 GGSN/P-GW
212 MTC-IWF
213 SCS
214 AS
215 AS
216 HSS
217 SMS-SC/GSMSC/IWMSC
218 CDF/CGF
219 SME
220 IP-SM-GW

The invention claimed is:

1. An information delivery system comprising:
a machine-to-machine (M2M) service PF configured to detect occurrence of a plurality of events and specify delivery area information of event information according to the events;
a cell broadcast center (CBC) configured to deliver the event information to a mobility management entity (MME) corresponding to the delivery area information specified by the M2M service PF; and
a gateway device configured to receive a delivery request containing the event information and the delivery area information from the M2M service PF, wherein:
the gateway device notifies the delivery request to the CBC,
the CBC determines the MME corresponding to the delivery area information contained in the delivery request, and
when the gateway device receives the delivery request from the M2M service PF, the gateway device determines whether it is allowed to deliver the event information transmitted from the M2M service PF to the MME.

2. The information delivery system according to claim 1, wherein
when the gateway device receives a plurality of delivery requests containing the event information and the delivery area information from the M2M service PF within a specified period of time, the gateway device controls transmission of the delivery requests according to priorities of the plurality of delivery requests.

3. The information delivery system according to claim 1, wherein the gateway device controls timing to transmit the event information to the CBC.

4. The information delivery system according to claim 3, wherein the gateway device controls timing to transmit the event information to the CBC based on a load condition of at least one of the CBC and the MME.

5. The information delivery system according to claim 1, wherein the gateway device generates billing information related to the delivery request when receiving the delivery request.

6. The information delivery system according to claim 1, wherein when the MME is changed, the CBC delivers the event information to the changed MME.

7. The information delivery system according to claim 1, wherein
the M2M service PF generates change information for changing a delivery area of the event information, and
the CBC delivers the event information to the changed delivery area.

8. The information delivery system according to claim 7, wherein
when the event information is delivered from the MME to a first mobile communication terminal belonging to the MME and a second mobile communication terminal located in a vicinity of the first mobile communication terminal,
the M2M service PF manages position information of the first mobile communication terminal and changes a delivery area of the event information based on the position information.

9. The information delivery system according to claim 1, wherein
when the event information is delivered from the MME to a first mobile communication terminal belonging to the MME and a second mobile communication terminal located in a vicinity of the first mobile communication terminal,
the information delivery system further comprises a position information management unit that manages delivery destination node information to which the first mobile communication terminal belongs, and
the CBC changes a delivery area of the event information based on the delivery destination node information managed by the position information management unit.

10. A gateway device comprising:
a receiving unit that receives a delivery request containing event information and delivery area information from an machine-to-machine (M2M) service PF configured to detect occurrence of a plurality of events and specify delivery area information of event information according to the events; and
a control unit that notifies the delivery request to a cell broadcast center (CBC), the CBC determining a mobility management entity (MME) corresponding to the delivery area information contained in the delivery request, wherein when the control unit receives the delivery request from the M2M service PF, the control unit determines whether it is allowed to deliver the event information transmitted from the M2M service PF to the MME.

11. The gateway device according to claim 10, wherein
when the receiving unit receives a plurality of delivery requests containing the event information and the delivery area information from the M2M service PF within a specified period of time, the control unit controls transmission of the delivery requests according to priorities of the plurality of delivery requests.

12. The gateway device according to claim 11, wherein
the control unit controls timing to transmit the event information to the CBC based on a load condition of at least one of the CBC and the MME.

13. The gateway device according to claim 10, wherein
the control unit controls timing to transmit the event information to the CBC.

14. The gateway device according to claim 10, wherein
the control unit generates billing information related to the M2M service PF having transmitted the delivery request when receiving the delivery request.

15. A delivery control method comprising:
receiving a delivery request containing event information and delivery area information from a machine-to-machine (M2M) service PF configured to specify delivery area information of event information according to a plurality of events;
notifying the delivery request to a cell broadcast center (CBC), the CBC determining a mobility management entity (MME) corresponding to the delivery area information contained in the delivery request; and
determining whether to deliver the event information transmitted from the M2M service PF to the MME.

16. A non-transitory computer readable medium storing a program causing a computer to execute:
- a step of receiving a delivery request containing event information and delivery area information from a machine-to-machine (M2M) service PF configured to specify delivery area information of event information according to a plurality of events;
- a step of notifying the delivery request to a cell broadcast center (CBC), the CBC determining a mobility management entity (MME) corresponding to the delivery area information contained in the delivery request; and
- a step of determining whether to deliver the event information transmitted from the M2M service PF to the MME.

* * * * *